(12) United States Patent  
Yokoyama

(10) Patent No.: US 6,863,290 B2  
(45) Date of Patent: Mar. 8, 2005

(54) SUSPENSION

(75) Inventor: Kenji Yokoyama, Kanagawa (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/448,205

(22) Filed: May 30, 2003

(65) Prior Publication Data

US 2003/0234506 A1 Dec. 25, 2003

(30) Foreign Application Priority Data

May 30, 2002 (JP) ........................................ 2002-156541

(51) Int. Cl.$^7$ ................................................ B60G 3/10
(52) U.S. Cl. ..................... 280/124.171; 280/124.174; 280/124.175
(58) Field of Search .................. 280/124.124, 124.125, 280/124.165, 124.17, 124.171, 124.172, 124.173, 124.174, 124.175; 267/260, 269

(56) References Cited

U.S. PATENT DOCUMENTS

| | | | | |
|---|---|---|---|---|
| 4,779,894 A | * | 10/1988 | Cowburn | 280/124.134 |
| 5,251,930 A | * | 10/1993 | Kusaka et al. | 280/124.14 |
| 5,826,896 A | * | 10/1998 | Baumann | 280/124.171 |
| 6,029,987 A | * | 2/2000 | Hoffman et al. | 280/124.171 |
| 6,189,904 B1 | * | 2/2001 | Gentry et al. | 280/124.175 |
| 6,457,729 B2 | * | 10/2002 | Stenvall | 280/124.134 |
| 6,530,587 B2 | * | 3/2003 | Lawson et al. | 280/124.17 |

FOREIGN PATENT DOCUMENTS

JP    11-263109 A    9/1999

* cited by examiner

*Primary Examiner*—Paul N. Dickson  
*Assistant Examiner*—Toan C To  
(74) *Attorney, Agent, or Firm*—Birch, Stewart, Kolasch & Birch, LLP

(57) ABSTRACT

A suspension includes: wheel supporting members for supporting wheels, a leaf spring having both end portions each arranged on an upper side of the respective wheel supporting member; a pivot supporting the leaf spring, and receiving pieces interposed between the wheel supporting members and the both end portions of the leaf spring respectively. Each of the wheel supporting members includes a recess portion on which one of the receiving pieces is mounted. Each of the receiving pieces includes an engaging portion for engaging with one of the both end portions of the leaf spring. Each of the receiving pieces includes an elastic member and a first metal plate joined on the elastic member. The elastic member can deform to follow a displacement of a relative position between the leaf spring and one of the wheel supporting members.

6 Claims, 3 Drawing Sheets

SUSPENSION

The present disclosure relates to the subject matter contained in Japanese Patent Application No. 2002-156541 filed May 30, 2002, which is incorporated herein by reference in its entirety.

BACKGROUND OF THE INVENTION

1. Field of the Invention

The present invention relates to a suspension in a vehicle, particularly to an independent suspension of a laterally mounted leaf spring type for independently suspending wheels on both sides of a vehicle by using a leaf spring provided along the vehicle width direction.

2. Background Art

As a conventional example of an independent suspension of a laterally mounted leaf spring type for independently suspending wheels on both sides of a vehicle in a vehicle width direction by using a leaf spring provided along the vehicle width direction, as shown by JP-A-11-263109, there is known a suspension in which a leaf spring is supported at middle portion thereof by a vehicle body via a pivot rubber and is engaged with wheel supporting members via an eye member at both end portions thereof.

Since the above-described conventional suspension had to have a complicated structure for connecting the both end portions of the leaf spring to the wheel supporting members, it was disadvantageous in terms of a number of assembling steps, cost of parts and durability.

It is an object of the invention to provide a suspension excellent in a number of assembling steps, cost of parts and durability, as an independent suspension of a laterally mounted leaf spring type for independently suspending wheels on the both sides of the vehicle by using a leaf spring provided along the vehicle width direction.

SUMMARY OF THE INVENTION

The invention provides a suspension including: wheel supporting members for supporting left and right wheels respectively on a vehicle body movably in a vertical direction; a leaf spring disposed on a lower side of the vehicle body, the leaf spring extending in a vehicle width direction and having both end portions each arranged on an upper side of the respective wheel supporting member; a pivot projecting from a lower face of the vehicle body and supporting on the vehicle body a middle portion of the leaf spring in the vehicle width direction; and receiving pieces respectively interposed between the wheel supporting members and the both end portions of the leaf spring; wherein each of the wheel supporting members includes a recess portion opened upwardly on which one of the receiving pieces is mounted to be prevented from detaching; each of the receiving pieces includes an engaging portion for engaging with one of the both end portions of the leaf spring to prevent detachment of the leaf spring; and each of the receiving pieces includes an elastic member and a first metal plate joined on an upper face of the elastic member, the elastic member capable of deforming to follow a displacement of a relative position in the vehicle width direction between the leaf spring and one of the wheel supporting members.

Therefore, the leaf spring is attached to the vehicle by using a simple structure in which the middle portion in the vehicle width direction of the leaf spring is brought into contact with the pivot to be supported by the lower face of the vehicle body, the both end portions of the leaf spring are engaged with the receiving pieces and the receiving piece is mounted to the recess portion of the wheel supporting member.

Attaching the leaf spring to the vehicle in this way allows the leaf spring to be bent taking the pivot as a fulcrum when load from the wheel supporting member is inputted to the both end portions of the leaf spring. Thereby, the wheel can be elastically suspended on the vehicle body.

A relative positional shift between the wheel supporting members and the both end portions of the leaf spring occurs when the leaf spring is bent. However, the elastic member of the receiving piece is deformed to follow respectively to the wheel supporting member and the both end portions of the leaf spring. Therefore, occurrence of friction between the wheel supporting member and the both end portions of the leaf spring can be prevented. Further, the first metal plate functions to transmit a face pressure inputted from the leaf spring to the receiving piece to the elastic member while making the face pressure uniform. Therefore, followability and durability of the elastic member can be promoted.

Preferably, each of the receiving pieces includes a second metal plate joined on a lower face of the elastic member.

Therefore, the face pressure inputted from the wheel supporting member to the receiving piece is made uniform by the second metal plate to be transmitted to the elastic member. Therefore, followability and durability of the elastic member can be promoted.

Preferably, the engaging portion is an erected wall disposed along one of the both end portions.

Therefore, a simple structure can be employed for preventing detachment of the leaf spring.

Preferably, the first metal plate has both end portions in a front and rear direction of the vehicle, the both end portions bent upwardly to form a portion of the erected wall.

Therefore, the first metal plate can also function as the erected wall. Thus, rigidity of the erected wall can be increased while using a simple structure. Further, detachment of the leaf spring can be surely prevented.

Preferably, the leaf spring includes two sheets of leaf springs laminated to each other and sliders. The sliders are interposed respectively between the two sheet of the leaf springs at both end portions thereof. The engaging portions of the receiving pieces are hole portions into which the both end portions of the two sheets of the leaf springs can be inserted along with the sliders.

Therefore, detachment of two sheets of the leaf springs can be prevented by using the simple structure. A leaf spring assembly can be formed by interposing the slider between two sheets of the leaf springs to insert into the hole portion of the receiving piece before assembling to the vehicle and therefore, a number of assembling steps can be reduced.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
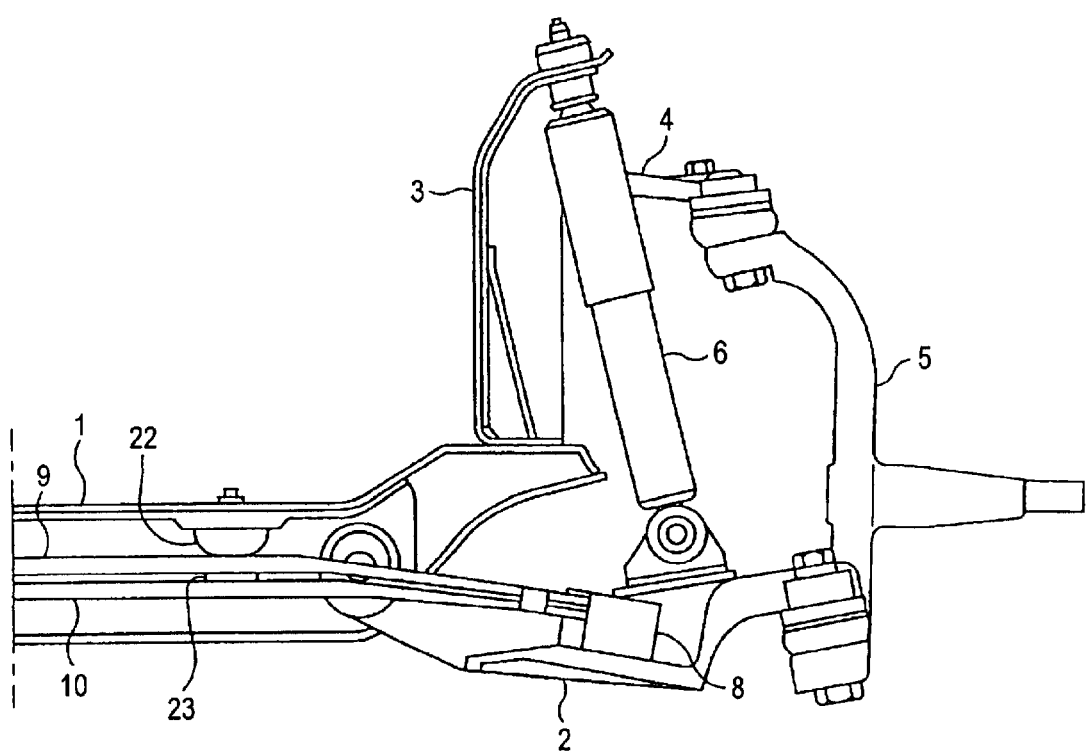
FIG. 1 is a rear view of an essential portion in an embodiment of the invention.
Figure 2:
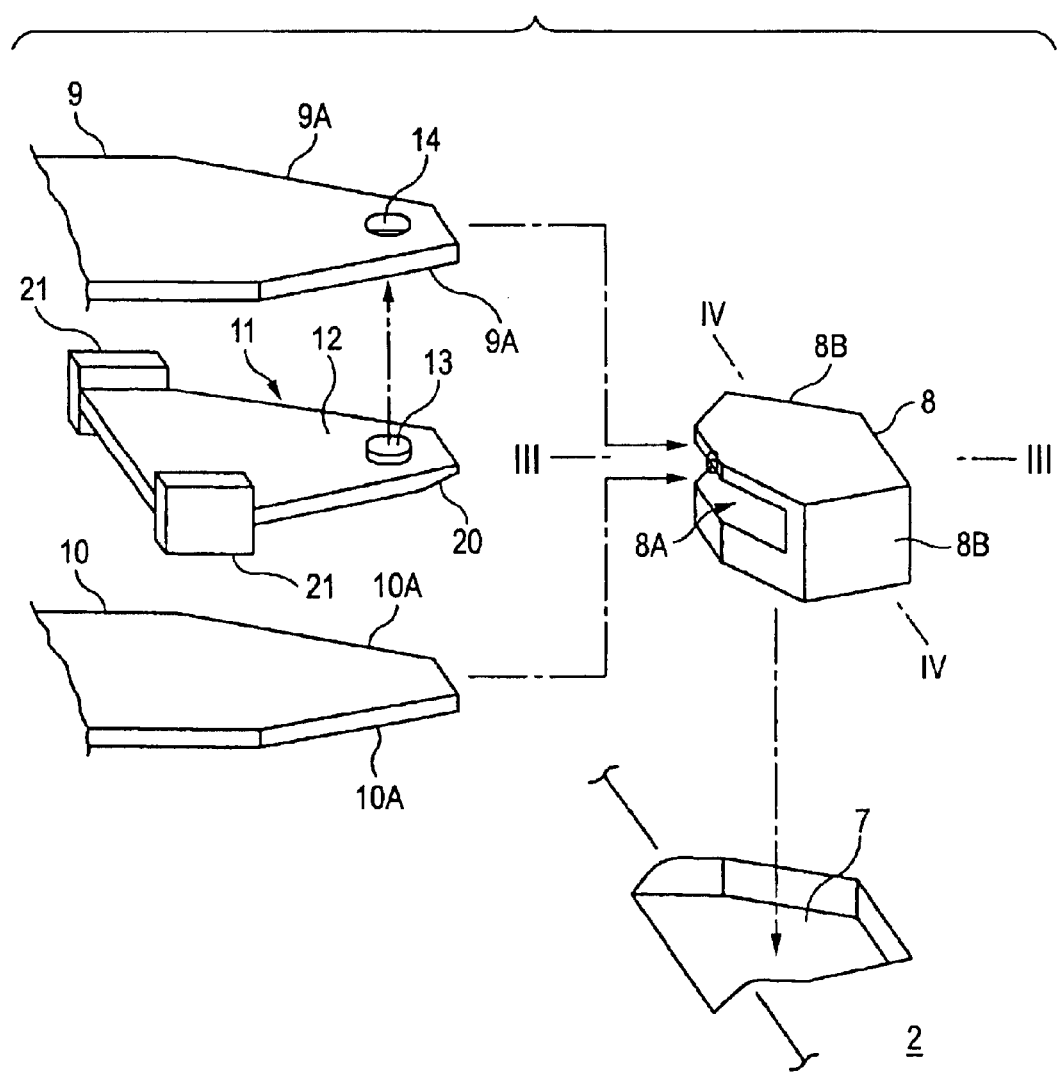
FIG. 2 is a partially exploded perspective enlarged view of the embodiment.
Figure 3:
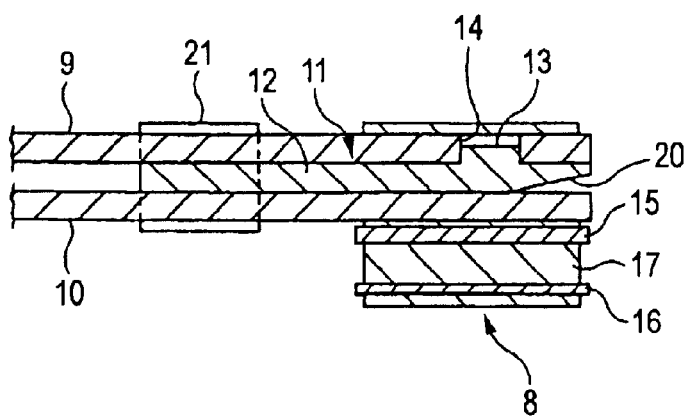
FIG. 3 is an enlarged view in a vertical section taken along a line III—III of FIG. 2.
Figure 4:
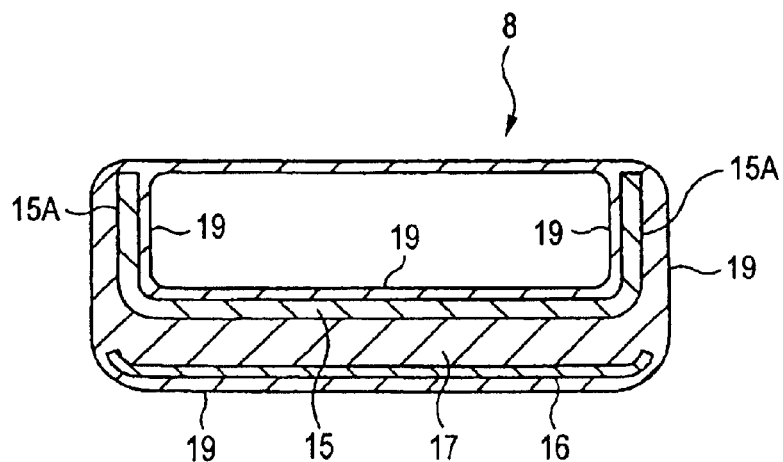
FIG. 4 is an enlarged view in a vertical section taken along a line IV—IV of FIG. 2.
Figure 5:
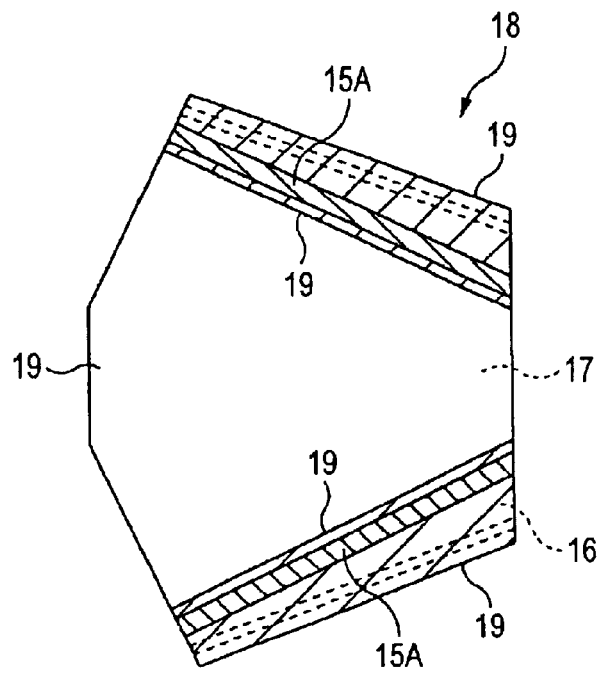
FIG. 5 is an enlarged view of in a cross section taken along the line IV—IV of FIG. 2.

An embodiment of the invention shown in the drawings will be explained as follows.

A cross member 1 extended in a vehicle width direction is connected to a vehicle body (not illustrated). Each of left and right ends of the cross member 1 is pivotally attached with one end of a suspension lower arm 2 and one end of a suspension upper arm 4 via a tower member 3. A wheel, not illustrated, is mounted to a knuckle 5 bridged between the two arms 2 and 4. A shock absorber 6 is attached to span the suspension lower arm 2 and the tower member 3. According to the embodiment, a wheel supporting member includes the two arms 2 and 4 and the knuckle 5.

Further, a receiving piece 8 is mounted to a recess portion 7 formed substantially in a trapezoidal shape on each of the left and right suspension lower arms 2. Two sheets of leaf springs 9 and 10 made of spring steel are laminated and disposed along the cross member 1 so as to extend in the vehicle width direction. The leaf springs 9 and 10 sandwiches a flat portion 12 of a slider 11 at right and left ends thereof. The slider 11 is made of a synthetic resin, such as polyacetal resin or the like. A projection 13 having an oval shape is projected upwardly from the flat portion 12 to be fitted and engaged into a slot 14 at an end portion of the leaf spring 9. The ends of the leaf springs 9 and 10 are inserted into a hole portion 8A of the receiving piece 8 in a state in which the slider 11 is thus positioned with respect to the leaf spring 9.

The receiving piece 8 is structured as follows: Both end portions 15A of a metal plate 15 (first metal plate) in a front and rear direction of the vehicle are bent upwardly to be disposed along the hole portion 8A. A metal plate 16 (second metal plate) is disposed below the metal plate 15 so as to sandwich a rubber elastic member 17 formed in a flat plate shape. A thin rubber elastic film 19 covers substantially whole outer face of the receiving piece. The metal plate 15 and the metal 16 are fixed to the rubber elastic member 17 respectively by vulcanizing adhesion. Further, each end portion 15A of the metal plate 15 constitutes a portion of an erected wall 8B of the receiving piece 8. The elected wall 8B is formed so as to fit along chipped-off end edges 9A and 10A. The chipped-off end edges 9A and 10A is formed so that widths of the end portions of the leaf springs 9 and 10 in the front and rear direction of the vehicle narrow gradually toward an outer side in the vehicle width direction.

The slider 11 is provided with a chamfer portion 20 formed to rise toward the outer side in the vehicle width direction at a lower face of an end portion thereof on the outer side in the vehicle width direction. The slider 11 has flanges 21 at both side edges thereof in the front and rear direction of the vehicle. The flanges 21 are integrally molded with the slider 11 and extend upward and downward from the slider 11. The flanges 21 are respectively engaged with both front and rear side faces of the leaf springs 9 and 10.

Further, a spacer 23 is disposed between the leaf springs 9 and 10 in the vicinity of a pivot 22 provided at the cross member 1. The leaf springs 9 and 10 are supported by the pivot 22 from an upper side thereof.

In the above-described apparatus, the leaf springs 9 and 10 are deformed to elastically bent upward and downward in accordance with an acting load in the vertical direction. The left and right shock absorbers 6 move telescopically according to a vertical displacement of the vehicle body. Thus, the vehicle body is elastically suspended from the left and right wheels pertinently.

When the leaf springs 9 and 10 are bent in the vertical direction, the end portions of the leaf spring 9 slides in the vehicle width direction on the leaf spring 10. At this time, the slider 11 slides on an upper face of the end portion of the leaf spring 10 integrally with the leaf spring 9. Therefore, friction generated between the end portion of the leaf springs 9 and 10 can be reduced and durability of the leaf springs 9 and 10 can be promoted.

When the leaf springs 9 and 10 are bent in the vertical direction and the end portions of the leaf spring 10 slides in the vehicle width direction relative to the suspension lower arm 2, the relative displacement causes the rubber elastic body 17 a shearing deformation to allow the rubber elastic body 17 to follow the end portions of the leaf spring 10 and the surface of the suspension lower arm 2. Thus, occurrence of friction between the end portions of the leaf spring 10 and the suspension lower arm 2 can be prevented.

Further, even when the end portion of the leaf spring 9 is brought into partial contact with one of the receiving pieces 8 to cause the metal plate 15 a partially large load, the load can be uniformly transmitted to the rubber elastic member 17 by using the metal plate 15. Therefore, following ability and durability of the rubber elastic member 17 can be favorably maintained. Also, a load acting from the suspension lower arm 2 on the receiving piece 8 can be uniformly transmitted to the rubber elastic member 17 by using the metal plate 16 on the lower side. Therefore, following ability and durability of the rubber elastic member 17 is further promoted. Further, the metal plate 15 also functions to reinforce the hole portion 8A of the receiving piece 8.

Further, the whole outer face of the receiving piece 8 is covered by the thin rubber elastic film 19. The leaf springs 9 and 10 inserted into the receiving piece 8 and a metal portion of the receiving piece 8 are not brought into direct contact with each other. Further, the suspension lower arm 2 mounted with the metal piece 8 and the metal portion of the receiving piece 8 are not brought into direct contact with each other. Therefore, occurrence of abnormal noises caused by bending deformation of the leaf springs 9 and 10 or wear of the leaf springs 9 and 10 can be surely prevented.

In assembling the suspension, a leaf spring assembly can be formed before being built into the vehicle by interposing the slider 11 between the leaf springs 9 and 10 and inserting the slider 11 along with the leaf springs 9 and 10 into the hole portion 8A of the receiving piece 8. Therefore, a number of assembling steps can be reduced.

It will be appreciated that modifications may be made in our invention. For example, although according to the embodiment, two sheets of the leaf springs are used, only a single sheet of the leaf spring can be used by omitting the spacer 23 and the slider 11. It should be understood that we intend to cover by the appended claims all modifications falling within the true spirit and scope of our invention.

As described above in details, according to the embodiment, it can be provided the independent suspension using two sheets of the leaf springs 9 and 10, which is excellent in a number of assembling steps, part cost, and durability.

According to the invention, in an independent suspension of a laterally mounted leaf spring type for independently suspending wheels on both sides in a vehicle width direction by using leaf springs provided along the vehicle width direction, a suspension excellent in a number of integrating steps, part cost and the durability can be provided.

What is claimed is:

1. A suspension comprising:

wheel supporting members for supporting left and right wheels respectively on a vehicle body movably in a vertical direction;

a leaf spring disposed on a lower side of the vehicle body, the leaf spring extending in a vehicle width direction and having both end portions each arranged on an upper side of the respective wheel supporting member;

a pivot projecting from a lower face of the vehicle body and supporting on the vehicle body a middle portion of the leaf spring in the vehicle width direction; and receiving pieces interposed between the wheel supporting members and the both end portions of the leaf spring respectively;

wherein each of the wheel supporting members includes a recess portion opened upwardly on which one of the receiving pieces is mounted to be prevented from detaching;

each of the receiving pieces includes an engaging portion for engaging with one of the both end portions of the leaf spring to prevent detachment of the leaf spring; and each of the receiving pieces includes an elastic member and a first metal plate joined on an upper face of the elastic member, the elastic member capable of deforming to follow a displacement of a relative position in the vehicle width direction between the leaf spring and one of the wheel supporting members.

2. The suspension according to claim 1, wherein each of the receiving pieces includes a second metal plate joined on a lower face of the elastic member.

3. The suspension according to claim 1, wherein the engaging portion is an erected wall disposed along one of the both end portions.

4. The suspension according to claim 3, wherein the first metal plate has both end portions in a front and rear direction of the vehicle, the both end portions bent upwardly to form a portion of the erected wall.

5. The suspension according to claim 1, wherein the leaf spring comprises two sheets of leaf springs laminated to each other and sliders;

the sliders are interposed respectively between the two sheet of the leaf springs at both end portions thereof; and the engaging portions of the receiving pieces are hole portions into which the both end portions of the two sheets of the leaf springs can be inserted along with the sliders.

6. The suspension according to claim 5, wherein the first metal plate has both end portions in a front and rear direction of the vehicle, the both end portions bent upwardly to form a portion of the erected wall.

* * * * *